US010780996B2

(12) United States Patent
Sallman et al.

(10) Patent No.: US 10,780,996 B2
(45) Date of Patent: Sep. 22, 2020

(54) TIRE PRESSURE EQUALIZATION AND INFLATOR

(71) Applicant: Three Zero Right, LLC, San Antonio, TX (US)

(72) Inventors: Ronald R. Sallman, Spring Branch, TX (US); Mark Drew Holland, San Antonio, TX (US)

(73) Assignee: Three Zero Right, LLC, San Antonio, TX (US)

( * ) Notice: Subject to any disclaimer, the term of this patent is extended or adjusted under 35 U.S.C. 154(b) by 68 days.

(21) Appl. No.: 16/186,964

(22) Filed: Nov. 12, 2018

(65) Prior Publication Data

US 2020/0148391 A1 May 14, 2020

(51) Int. Cl.
*B60S 5/04* (2006.01)
*B64F 5/40* (2017.01)

(52) U.S. Cl.
CPC .. *B64F 5/40* (2017.01); *B60S 5/04* (2013.01)

(58) Field of Classification Search
CPC .. B60S 5/04; B60S 5/043; B60S 5/046; B64F 5/40
USPC ......................................................... 137/227
See application file for complete search history.

(56) References Cited

U.S. PATENT DOCUMENTS

| | | | | |
|---|---|---|---|---|
| 4,427,022 A * | 1/1984 | Forney | ...................... | B60S 5/04 137/224 |
| 6,144,295 A * | 11/2000 | Adams | .................. | B60C 23/003 137/224 |
| 6,336,481 B1 * | 1/2002 | Tigges | .................. | B60C 23/003 141/38 |
| 7,882,731 B1 * | 2/2011 | Franks | .................... | G01L 17/00 152/417 |
| 2015/0136270 A1 * | 5/2015 | Keane | ................... | B60C 23/003 141/4 |
| 2019/0263362 A1 * | 8/2019 | Hammer | ................. | B60C 29/00 |

OTHER PUBLICATIONS

Wikipedia, "Tire-pressure monitoring system". https://en.wikipedia.orgiwikiffire-pressure_monitoring_system.
RV Electronics, Product Reviews, "Top 8 Best RV Tire Pressure Monitoring System (TPMS) Reviews for 2018.".
Amazon.com: "Poly Performance High Pressure, No-Air-Loss Chuck (2305-011)". https://www.amazon.com/Poly-Performance-No-Air-Loss-2305-01/dp/BOOZSWX. . . .
"Poly Performance High Pressure, No-Air-Loss Chuck". HTTPS://WWW.POLYPERFORMANCE.COM/SENDFRIEND/PRODUCT/SEND/ID/957/.
Schrader, "Schrader High Pressure Valves & Connectors." Schraderinternational.com.

* cited by examiner

*Primary Examiner* — Paul J Gray
(74) *Attorney, Agent, or Firm* — Gunn, Lee & Cave, PC

(57) ABSTRACT

An apparatus and method to equalize the pressure in multiple tires supported by a single axle or strut of an airplane is shown. A control block connects the pressurized gas to a distribution block and meter. From the distribution block high pressure lines and no-loss chuck valves connect the pressurized gas to the multiple tires. Steps to be followed as programmed in the meter include startup, testing, calibration, setup and finalize. A permanent record of the steps in equalizing tire pressures is maintained.

7 Claims, 13 Drawing Sheets

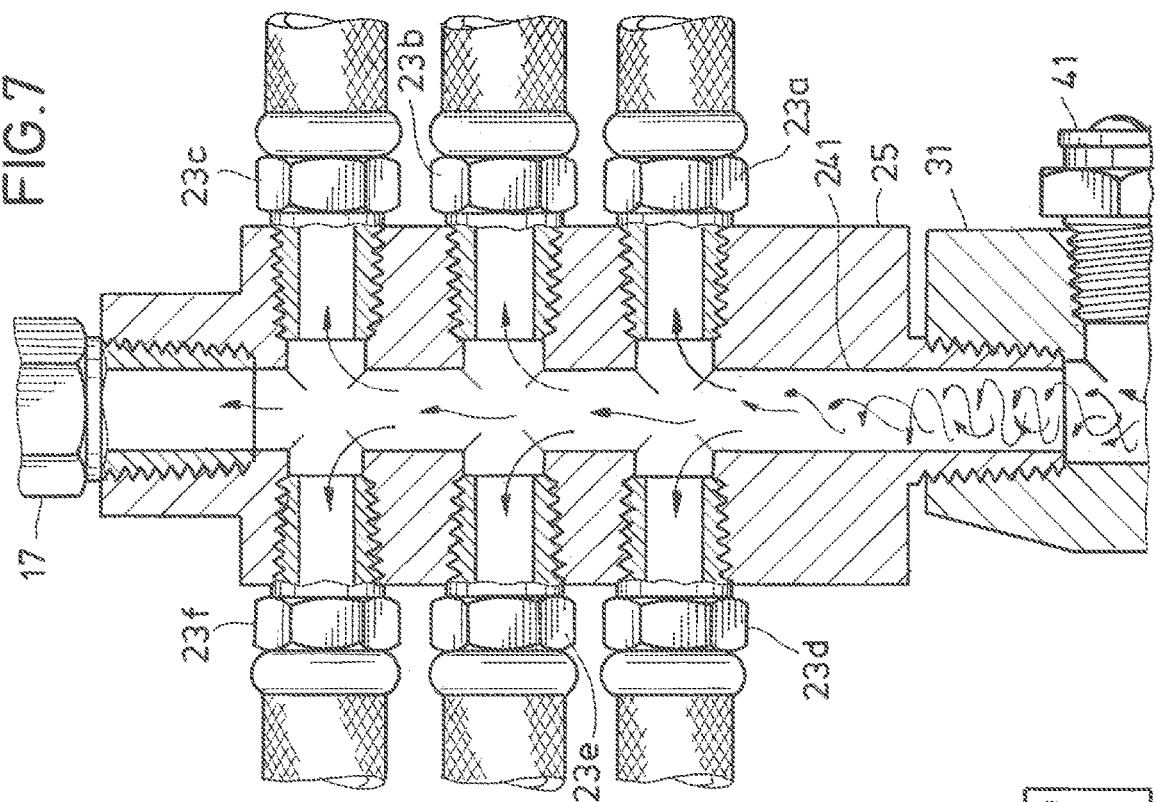
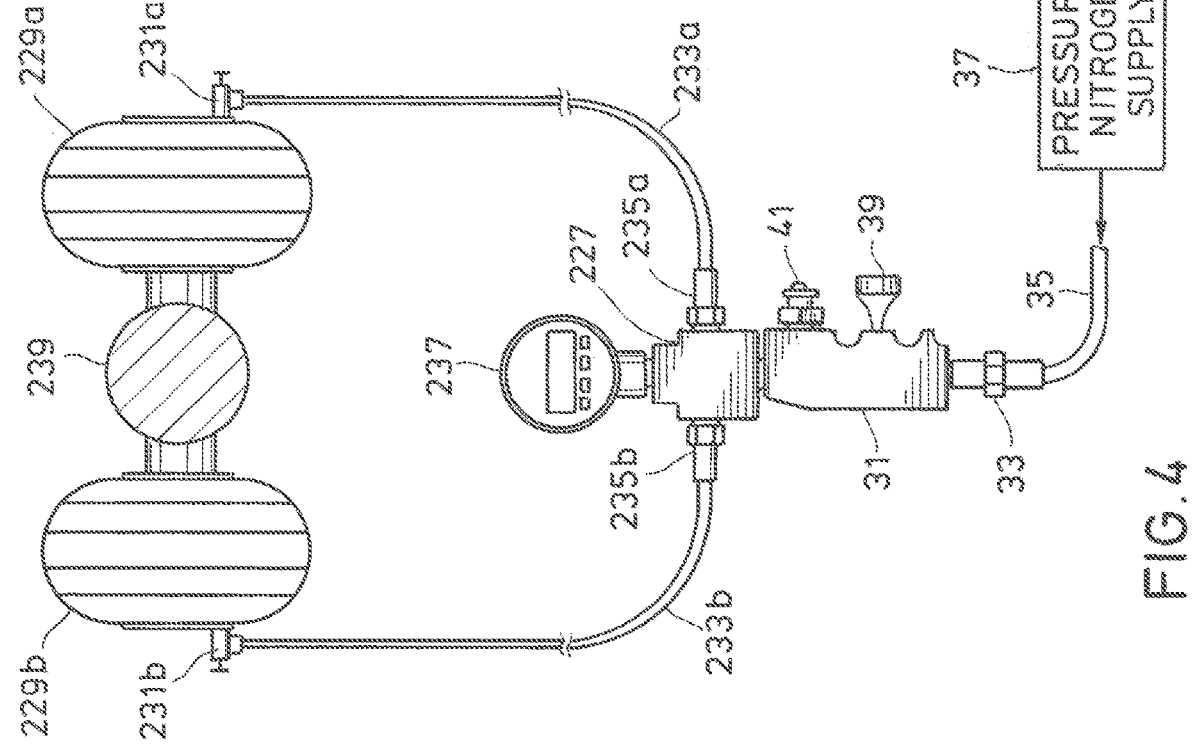

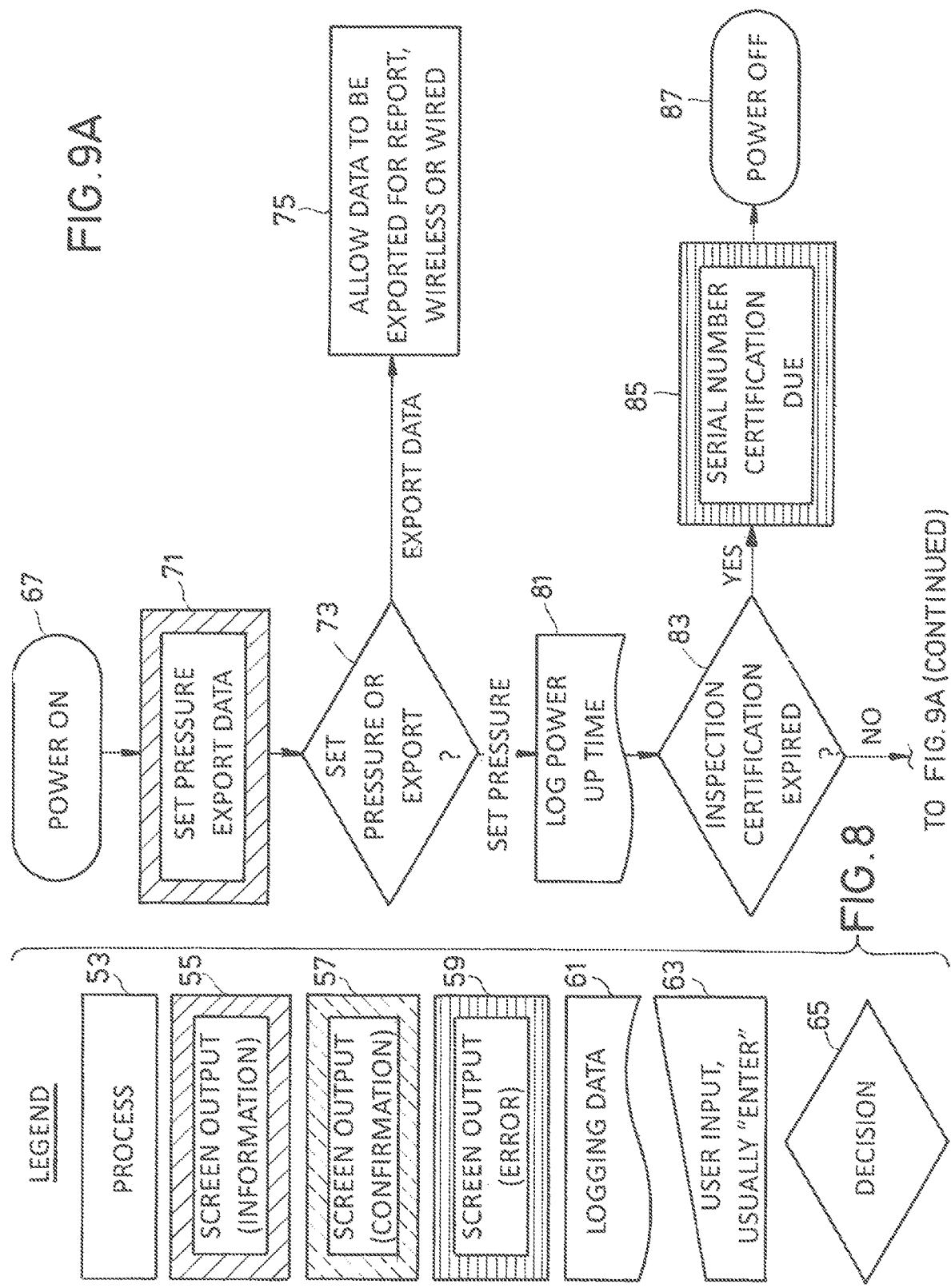

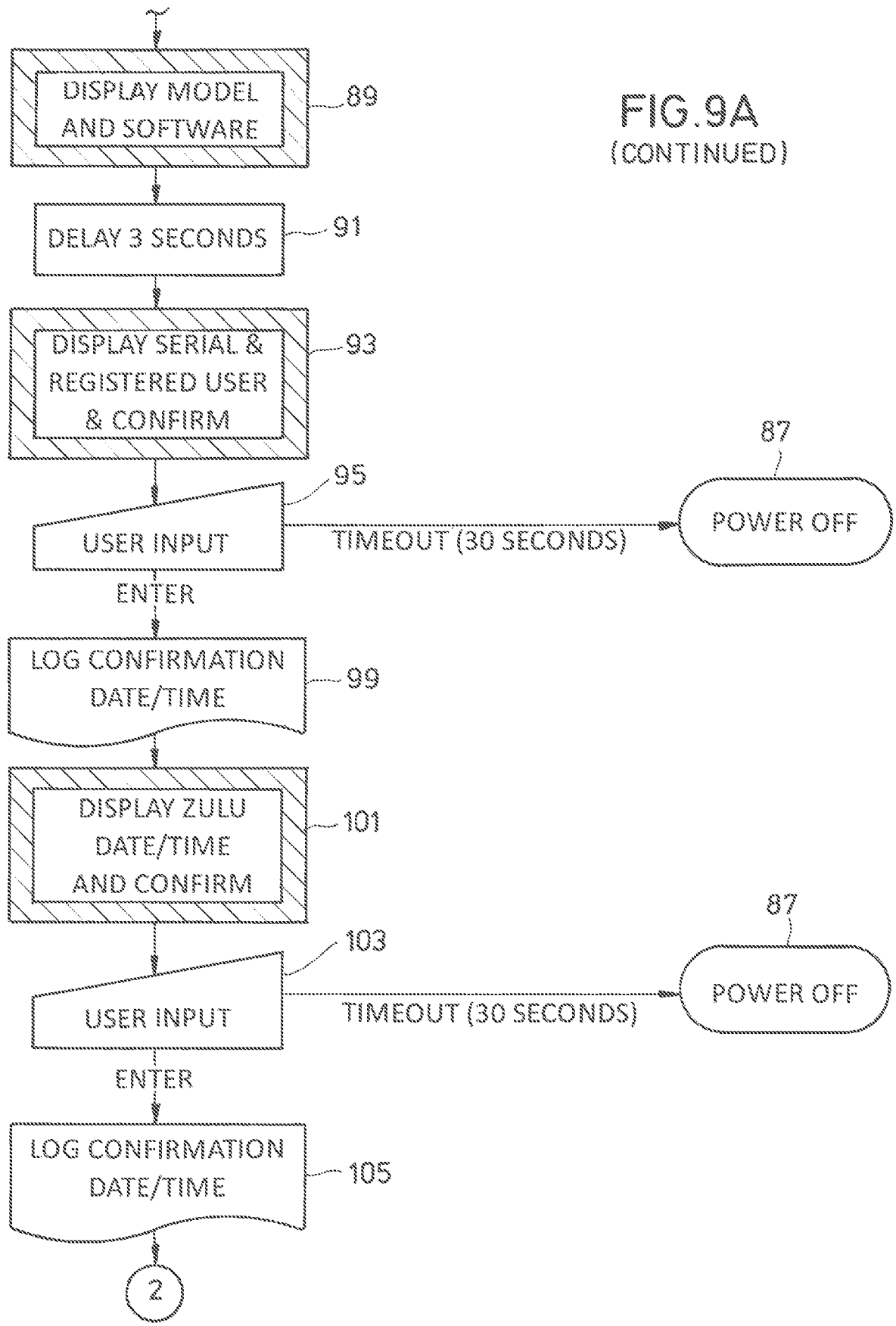

TIRE PRESSURE EQUALIZATION AND INFLATOR

BACKGROUND OF THE INVENTION

1. Field of the Invention

The invention generally relates to the inflation and maintaining equal pressure between dual tires and, more particularly, the apparatus and method used in the equalization and/or inflation.

2. Description of the Prior Art

When a single tire does not have enough strength to support a load, a common way to solve the problem is to add additional tires. In aircraft, this is accomplished by either having more than one tire on an axle, or adding additional axles with additional tires, all of which are suspended from a single strut. Depending on the design of the aircraft, additional struts with additional tires may be added.

In an aircraft it is extremely important for all the tires connected to a single strut to have equal pressure. The strut may have dual tires on a single axle on which the pressure needs to be equalized. In bigger systems, a single strut may support multiple axles with tires being on each end of each axle. For multiple axles, it is important for all the tires suspended from a single strut to have equal pressure.

If there is not equal pressure in all of the tires, there will be uneven wear on the tire during aircraft landings, which may cause tire failure or a premature replacement of the tires at a substantial cost. The tire that is inflated the most will wear faster than the other tires suspended from that strut.

The current procedure to insure equalized pressure is dictated by the Federal Aviation Administration (FAA), is time consuming, but is not that accurate. Tires on commercial aircraft often have to be replaced much earlier than their life expectancy due to tire wear. By ensuring that the tire pressure in every tire suspended from a single strut is equal, the life of the tires is greatly increased.

While tire pressure equalizers have been designed in the past for use on dual tires of trucks or similar vehicles, those tire pressure equalizers (1) cannot operate in the environment of a commercial aircraft and (2) do not provide the accuracies as is provided for the current invention. Further the FAA has dictated that the tire pressures on a single strut must be equal with very little tolerance, which the prior tire pressure equalization systems are incapable of doing,

SUMMARY OF THE INVENTION

It is an object of the present invention to provide equal tire pressures on dual wheels of an aircraft suspended from a single strut.

It is yet another object of the present invention to provide a system of monitoring and recording the equalization of tire pressures suspended from a single strut of an aircraft.

It is yet another object of the present invention to provide an apparatus and method of equalizing and recording the tire pressures of an aircraft with a minimum amount of time and effort by the ground crew.

It is a further object of the present invention to record everything that occurs during the equalization of tire pressures in an aircraft.

It is still another object of the present invention to have a standard apparatus and procedure for equalizing pressure in dual tires of an aircraft while simultaneously recording all the steps that occurred.

DESCRIPTION OF THE DRAWINGS

FIG. 4 is a pictorial illustration of the mechanical portion of the tire pressure equalizer and/or inflator being used on two tires suspended from a single strut of an aircraft.

FIG. 7 is a cross-sectional view of the nitrogen distribution block shown in FIG. 1 with arrows representing the path of nitrogen flow during inflation.

FIG. 8 is the legend table for the flow diagram.

DESCRIPTION OF THE PREFERRED EMBODIMENT

Figure 1:
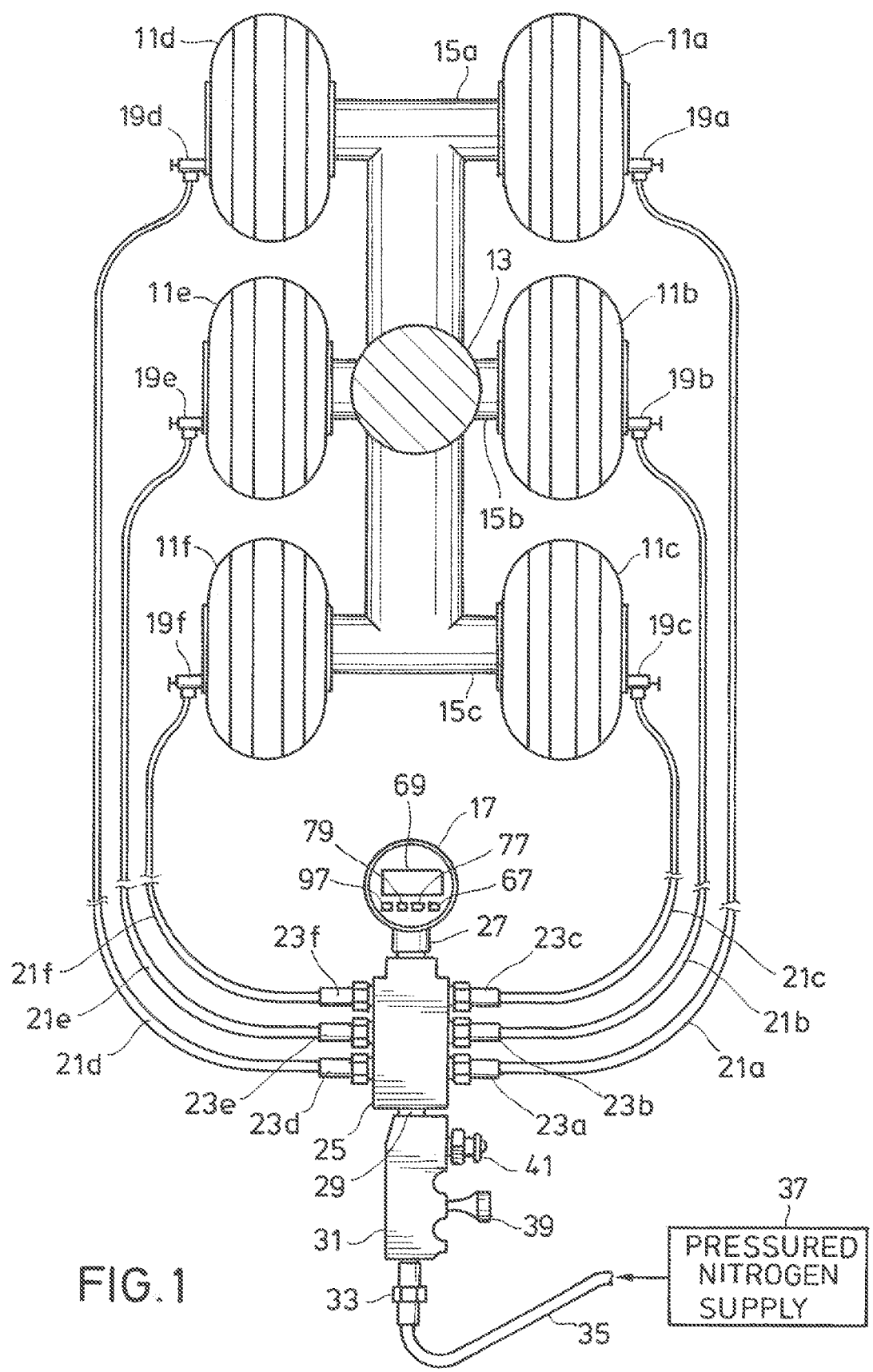
FIG. 1 is a pictorial illustration of the mechanical portion of the tire pressure equalizer and/or inflator being used on six tires suspended from a single strut of an aircraft.

Assume an aircraft has landed that has six wheels 11*a*, 11*b*, 11*c*, 11*d*, 11*e* and 11*f* attached to a single strut 13 connecting axles 15*a*, *b*, and *c* (see FIG. 1). After some preliminary diagnostic work by the meter 17, as will be described subsequently, no loss chuck valves 19*a*, 19*b*, 19*c*, 19*d*, 19*e* and 19*f* are connected to the valve stems of wheels 11*a*, 11*b*, 11*c*, 11*d*, 11*e* and 11*f*, respectively. The no loss chuck valves 19*a* thru 19*f* connect through high pressure nitrogen lines 21*a*, 21*b*, 21*c*, 21*d*, 21*e* and 21*f*, respectively, to high pressure fittings 23*a*, 23*b*, 23*c*, 23*d*, 23*e* and 23*f*, respectively. The high pressure fittings 23*a* through 23*f* connect to the nitrogen distribution block 25.

Figure 2:
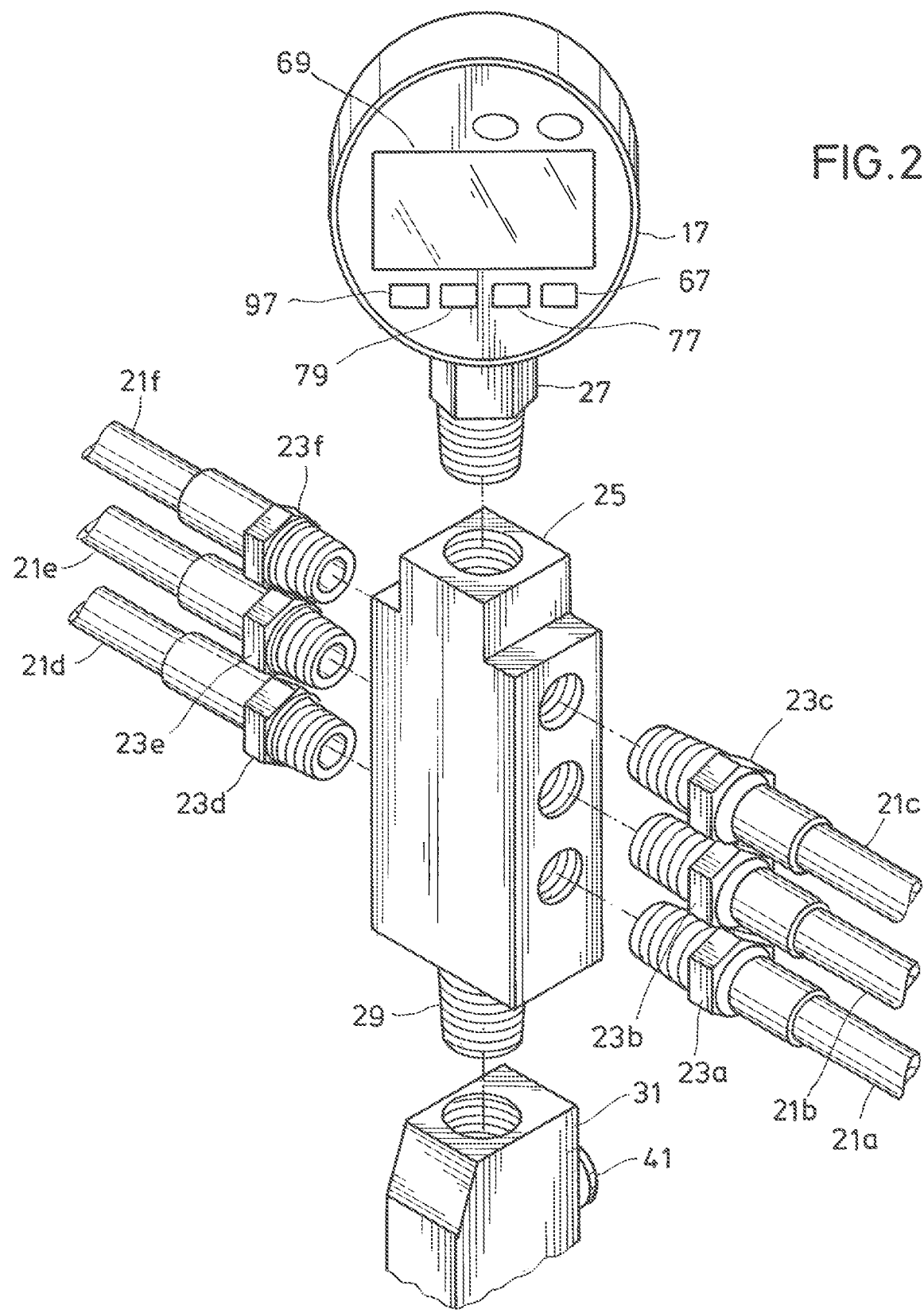
FIG. 2 is an exploded perspective view of the nitrogen distributor block shown in FIG. 1.

Referring to FIG. 2 in combination with. FIG. 1, the connections to the nitrogen distribution block 25 by each of the fittings 23*a* thru 23*f* is shown in more detail. The meter 17 is connected to the nitrogen distribution block 25 by meter fitting 27. The bottom of the nitrogen distribution block 25 is connected by threaded fitting 29 to the nitrogen control block 31. The bottom of the nitrogen control block 31 is connected by nitrogen supply fitting 33 through nitrogen line 35 to a pressurized nitrogen supply 37. Within the nitrogen control block 31, there is a spring-loaded control valve 39 and a wring-loaded bleed valve 41.

Figure 5:
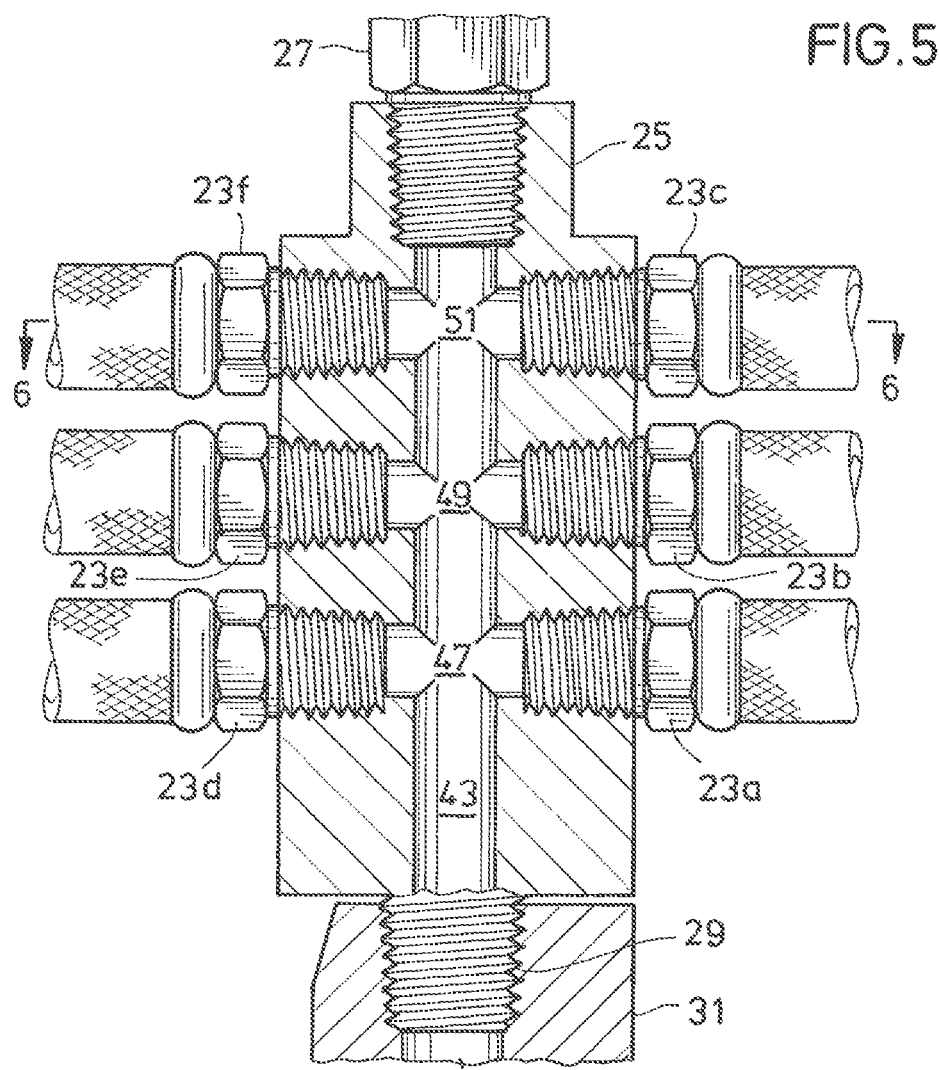
FIG. 5 is a cross-sectional view of a nitrogen distribution block shown in FIG. 1
Figure 6:
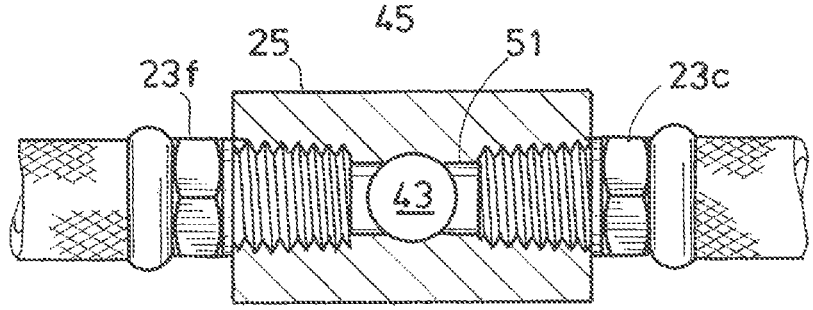
FIG. 6 is a cross-sectional view of FIG. 5 along section lines 6-6.

Referring to FIGS. 5 and 6, cross-sectional views of a nitrogen control block 25 are shown. A central bore 43 connects to feed passage 45 to receive the pressurized nitrogen in a manner as will be subsequently described. The central bore 43 connects to cross-bores; 47, 49 and 51 to provide the pressurized nitrogen through high-pressure fittings 23*a* through 23*f*.

Referring now to FIG. 8, a legend is given for the logic flow diagram as shown in FIGS. 9*a* thru 9*e*. A clear rectangular block 53 indicates a process is being performed.

A block cross-hatched like block 55 indicates there is a screen output of information. A block cross-hatched like block 57 indicates there is a screen output (confirmation). A block cross-hatched like block 59 is a screen output (error). A block shaped similar to block 61 indicates the logging of data. A block similar in shape to block 63 indicates there is user input, usually "ENTER". When there is a block shaped like block 65, a decision is being made.

Referring to FIG. 9A, the start-up procedure is given. Before anything is connected to the wheels 11a thru 11f, a start-up procedure shown in FIG. 9A is followed. The power ON button 67 is pushed on meter 17 as shown in FIG. 1, and at the beginning of the start-up sequence as shown in FIG. 9A. After power ON, the screen 69, as shown in FIG. 1, may go through a menu including set pressure 71 as shown in FIG. 9A. A decision will need to be made on whether to set pressure or export data 73. If data is exported, the data is allowed to be exported for a report by either wireless or wired connection 75.

If pressure is to be set, UP button 77 or DOWN button 79 on meter 17 is pressed (see FIG. 1). At the time of setting pressure, nothing is connected to the wheels 11. The power UP time is logged 81. A decision is made on whether the inspection certification has expired 83 for the equipment that is being used. If the answer is "yes," the serial number and certification date 85 are given and the unit will power OFF 87. If the certification is not due, the screen 69 will display the model and software 89 being used. After a three-second delay 91, the screen 69 will display the serial number and registered user 93. It is important for the user to know that he has the correct serial number and is the registered user of the particular equipment being used. If the equipment appears to be correct, a user input 95 is entered by pressing ENTER button 97 on the meter 17, shown in FIG. 1. If after thirty seconds, the user does not press ENTER button 97, the unit will power OFF 87.

Assuming the user has pressed ENTER button 97, there is a log confirmation of date and time 99. The screen 69 will display Zulu date/time and confirm 101. Zulu date/time is used because airplanes fly around the world in many different time zones and dates. Again, a user input 103 will have to be entered with ENTER button 97 to log confirmation date/time 105. If within thirty seconds the user does not press the ENTER button 97, the unit will power OFF 87. The steps as just described in conjunction with FIGS. 9A are the start-up procedure.

Figure 9B:
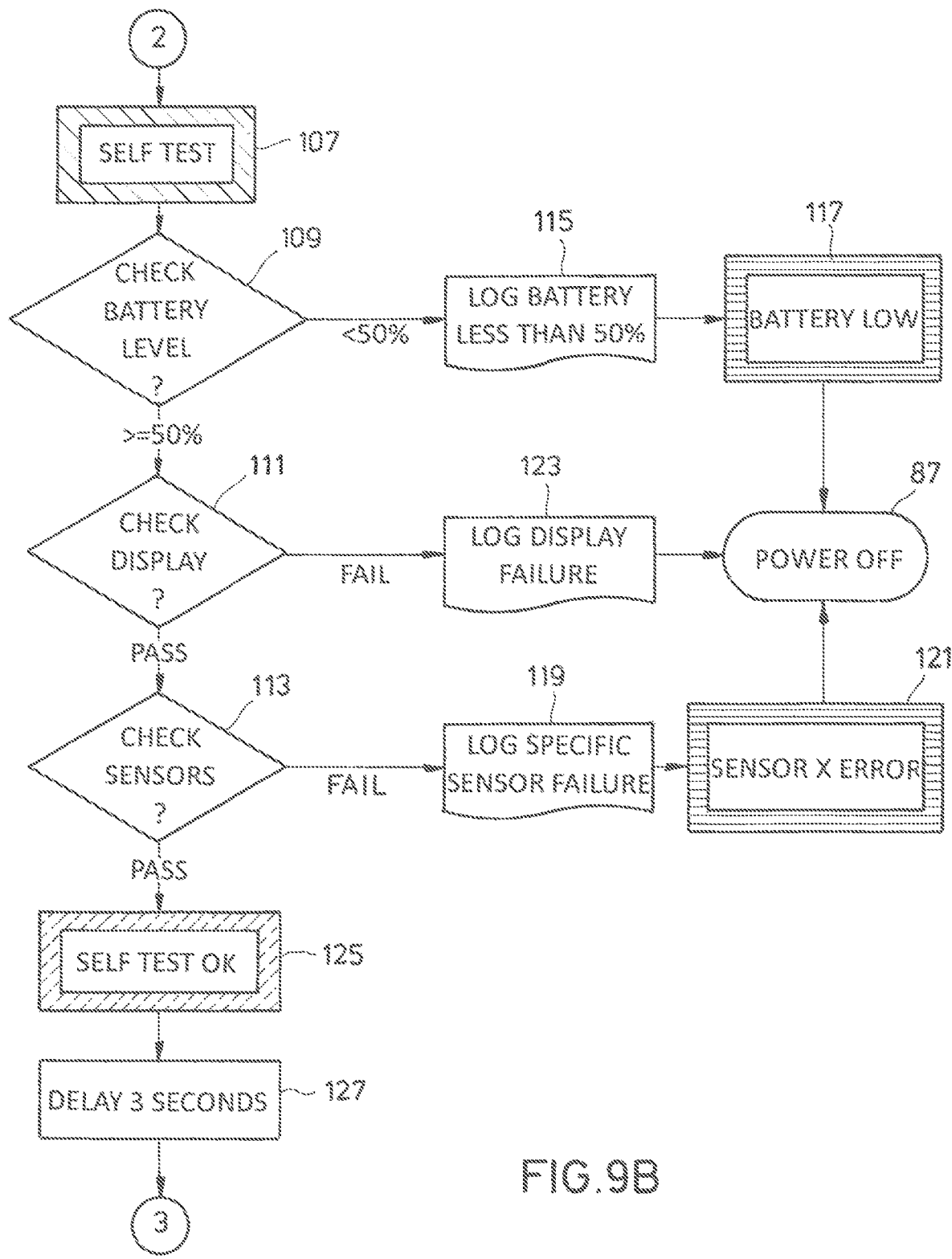
FIGS. 9A, B, C, D and E are a flow diagram showing the functions accomplished during equalizing tire pressure of an aircraft.

Going to FIG. 9B, a self-test 107 is performed by the meter 17. In the self-test, there is a check battery level 109, a check display 111 and a check sensor 113. If the battery is less than 50% 115, a battery LOW 117 is indicated and power OFF 87. If the battery is less than 50%, it is recorded as a battery LOW 117.

In checking sensors 113, it is logged if specific sensor failure 119, sensor error 121 indicated and again there is power OFF 87.

Figure 9C:
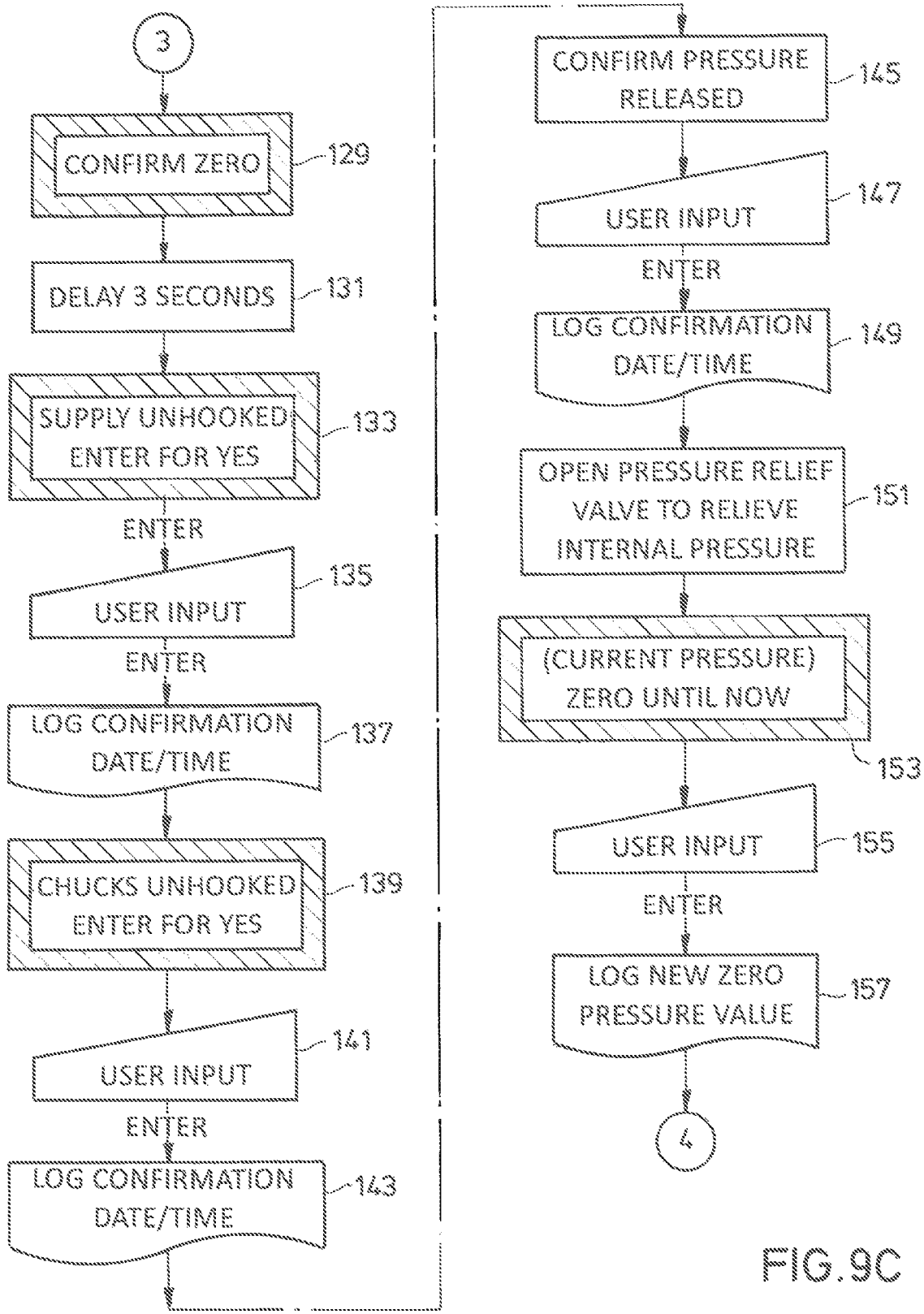

In the check display 111 if there is a failure, there is a log display failure 123 and again, a power OFF 87. If in the self-test 107 everything passes, then a self-test okay 125 is indicated. After a three-second delay 127, calibration is started as shown in FIG. 9C.

After the three-second delay 127, the screen 97 will confirm zero 129 if the device is reading zero pressure. This step is important because use of the device may occur at different elevations, which have different atmospheric pressure that can affect the readings. A zero reading must be for the particular atmospheric pressure where the apparatus is in use. After a three-second delay 131, a series of questions will be asked the user. For example, the user will be asked if the nitrogen supply is unhooked 133. The user would enter a user input 135 by pressing ENTER button 97 indicating the nitrogen supply is unhooked. That will be logged in confirmation with date and time 137.

Next, the user will be asked if the no loss chucks are unhooked 139 and if they are, a user input 141 will be entered and there will be a log confirmation date/time 143.

Next, the user will be asked to confirm pressure released 145 to which a user input 147 will be entered by pressing ENTER button 97, which will then have a log confirmation date/time 149. If there is any internal pressure, there will be an open pressure relief valve 151 which can consist of pushing spring-loaded bleed valve 41. The screen 69 will then indicate the current pressure 153. The user input 155 will zero the unit by UP button 77 or DOWN button 79 until a log of a new zero pressure value 157 is entered.

Figure 9D:
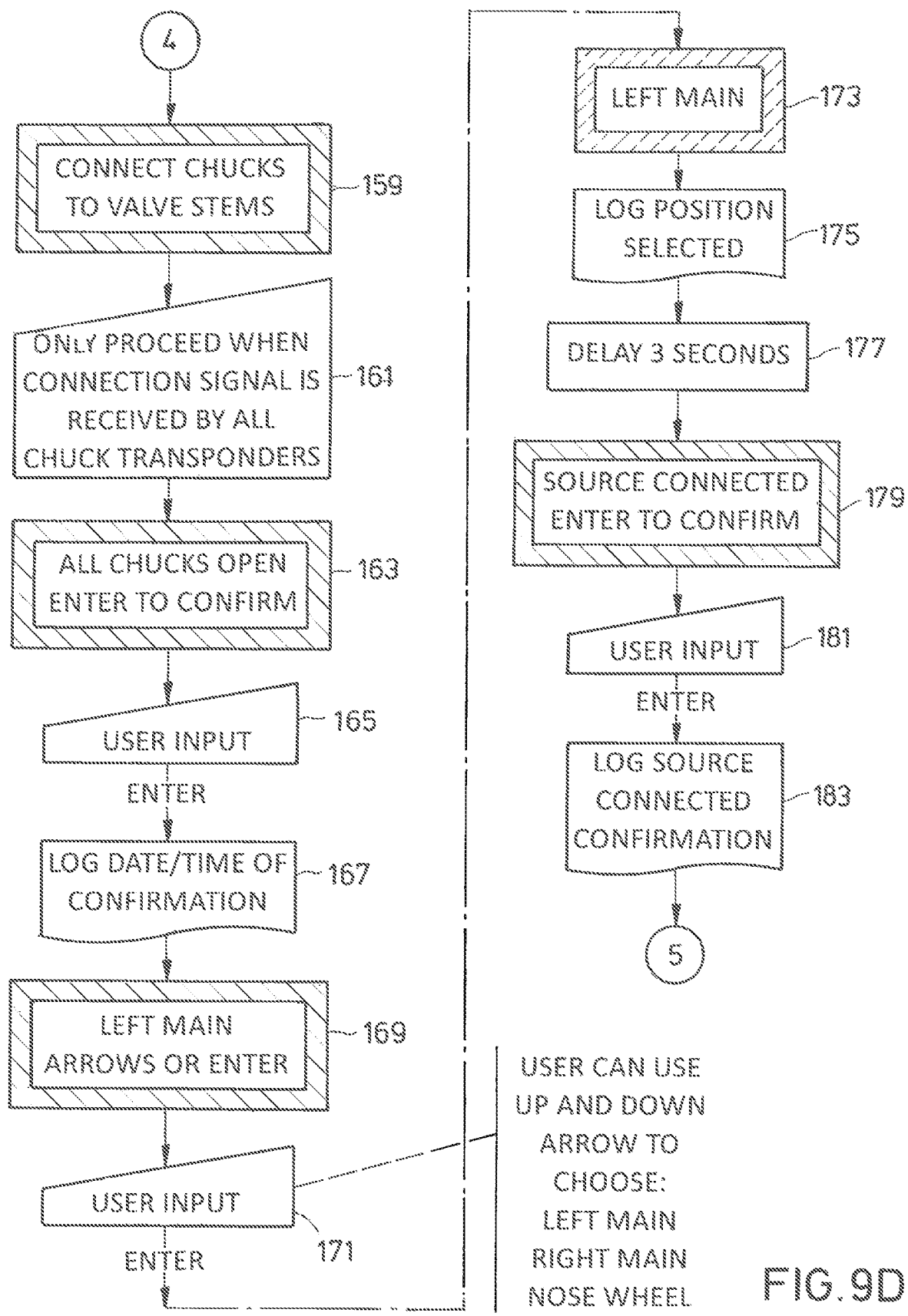

Now that the equipment has been calibrated, the equipment can be connected to the tires that need to he equalized in pressure, the set up procedure being shown in FIG. 9D. The user connects chucks to valve stems 159 by physically screwing the chuck valves 19a through 19f onto the valve stems (not shown) of the tires 11a thru 11f, respectively. The user is instructed to proceed only when connection signal was received back by all chuck transponders 161 as will be explained in more detail subsequently in describing the operation of the chuck valves 19a through 19f. Once the signal has been received that all chuck valves 19a through 19f are connected, the operator confirms all chucks OPEN 163 by user input 165, which is pressing the ENTER button 97. The user input 165 will result in log of date time of confirmation 167.

On many airplanes there are three landing gears including the right main gear, left main gear and the nose main gear. The screen 69 will scroll through left main gear with arrows 169 that requires a user input 171 to indicate in which landing gear the pressure is being equalized. The UP button 77 or DOWN button 79 can move the indicator to either the left main, right main, or nose wheel, depending in which the nitrogen pressure is being equalized. Once the screen 69 displays the correct landing gear, the user input 171 is made through the ENTER button 97. For purposes of illustration, assume the left main 173 was selected. The position selected will be logged 175. After a three-second delay 177, the user checks that source connected 179 by pushing the ENTER button 97 in user input 181. The source connected confirmation will be logged 183.

Figure 9E:
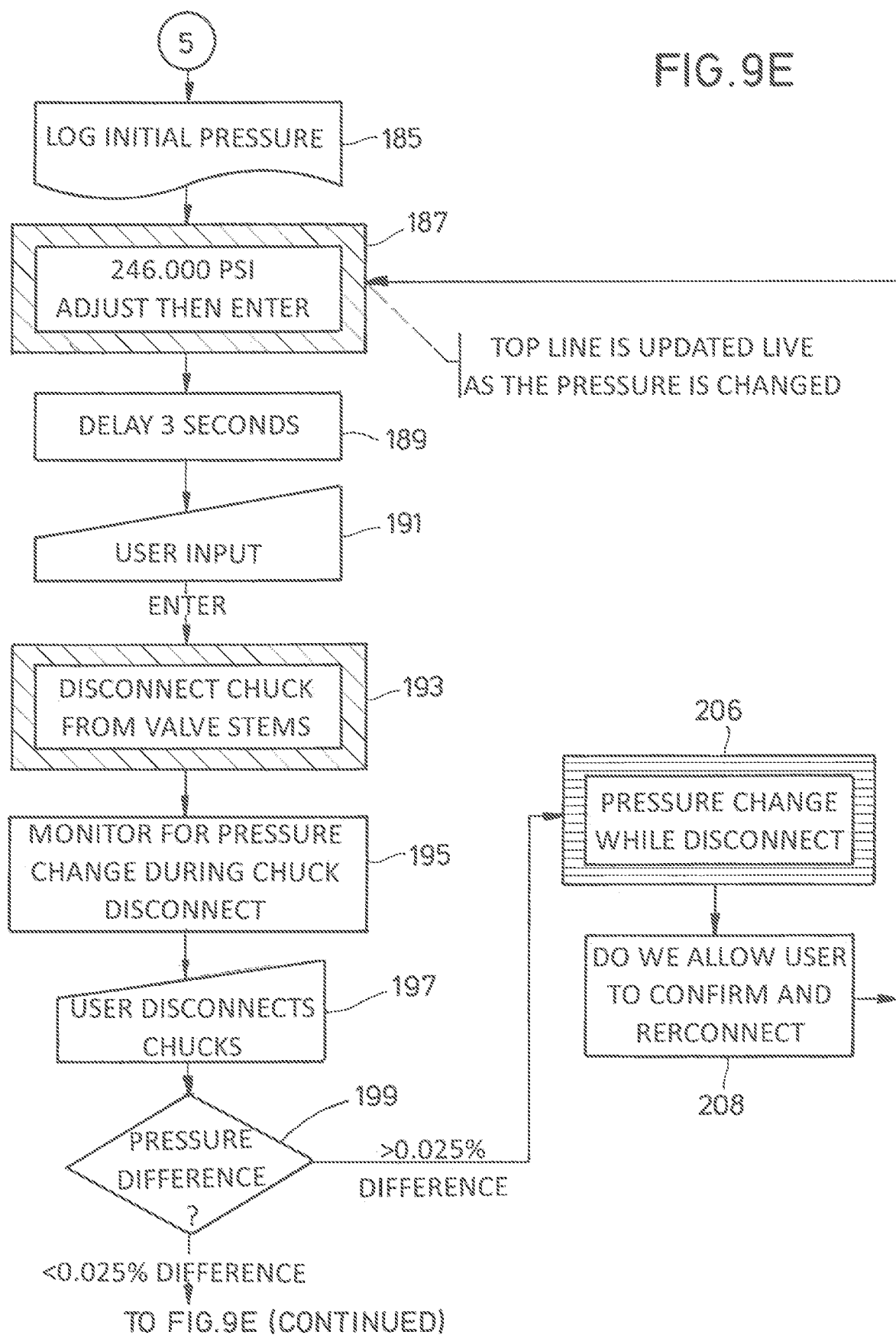
Figure 9E:
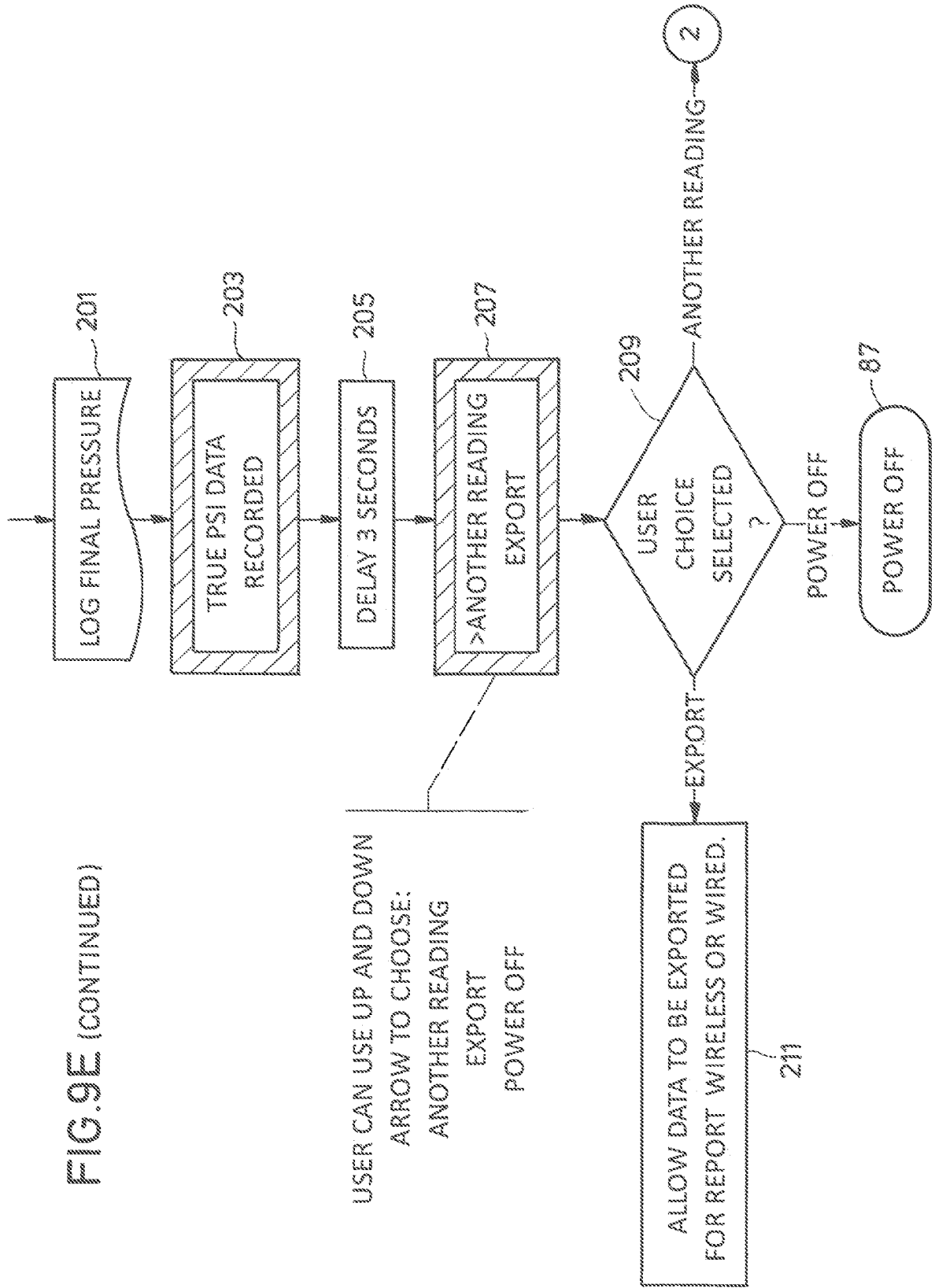

Now that the start-up, testing, calibration and set-up are complete, it is time to finalize the equalization of the pressure of the nitrogen in the tires 11a through 11f as shown in FIG. 9E. During the prior set-up as described in conjunction with FIG. 9D, enough time should have passed for the pressure in tires 11a that 11f to have equalized. The screen 69 will show the equalized tire pressure, which initial pressure is logged 185. The operator may increase the air pressure by turning the spring-loaded control valve 39 to increase the air pressure in the tires 11a through 11f, or decrease the pressure by pushing the spring-loaded bleed valve 41. After the operator has made the adjustment 187, there is a delay 189 for user input 191 through the ENTER button 97. At this point, the pressure inside of each of the tires 11a thru 11f should be equalized. The chuck valves 19 are disconnected from the valve stems 193, but the pressure is continued to be monitored in the no-loss chuck valves 19a through 19f during disconnection 195. While monitoring for pressure change during chuck valve disconnection 195, the user disconnects the chucks 197. A decision now has to be made on whether the pressure difference is less than ±2%. Assuming the pressure difference 199 is within the acceptable level by the FAA, the final pressure is logged 201 and the True PSI data is recorded 203.

However, if the pressure difference 199 is not within the acceptable range of the FAA, a warning of pressure change while disconnect 206 is given. The user is allowed to confirm and reconnect 208 before going back to the adjustment 187. While there is no number that is shown for the number of times the user can confirm and reconnect, there would be a limit in the number of times that can be repeated with three being the preferred number.

After a True PSI data is recorded 203 and after a three-second delay 205, another reading is exported 207, such as indicating the system has been changed to the right main strut. A user choice is selected 209. If there are no changes, there will be a power OFF 87. If another reading is selected, the user may go back to the testing steps as shown in FIG. 9D. Also, when the user choice is selected 209, data could be exported for a report 211. The data could be exported either by wireless or a wired connection.

By using the procedure as just described, the tire pressure can be equalized to a ±0.025% difference, which is much higher than the FAA standard.

Optionally, when switching from one landing gear to another on the same plane, since start-up testing and calibration have already occurred, the user could go directly to the set-up as shown in FIG. 9D.

Optionally, additional steps could be included for additional things. For example, the tail number of the airplane could be recorded by entering the number on the screen 69 of the meter 17.

Figure 10:
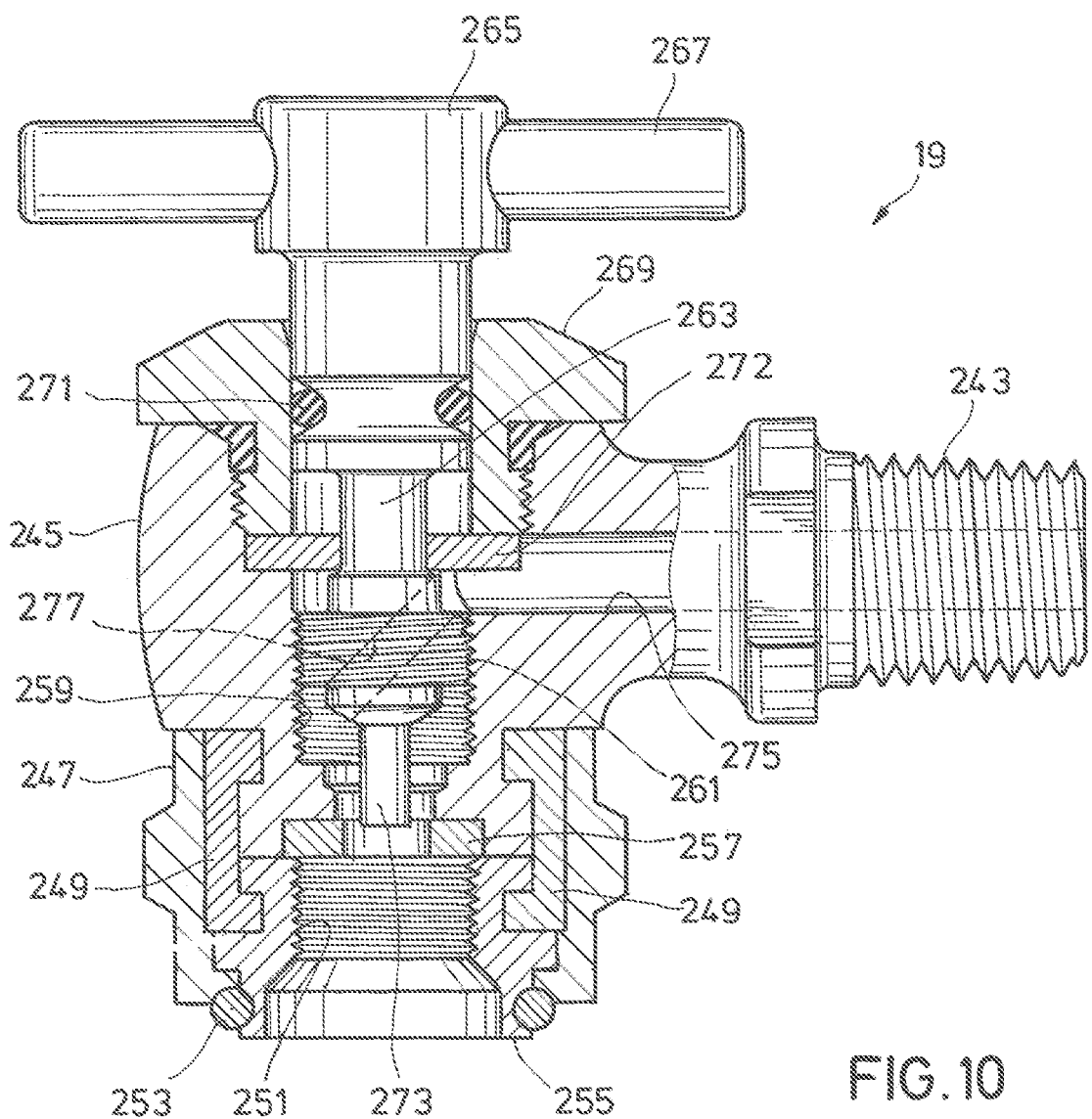
FIG. 10 is a cross-sectional view of a no-loss chuck valve.

Referring now to FIG. 10, a cross-sectional view of a no-loss chuck valve 19 is shown. A fitting 243 connects the no-loss chuck valve 19 to the high-pressure nitrogen line 21 shown in FIG. 1. The fitting 243 is formed with the, body 245. On the bottom of the body 245 is the outside sleeve 247 which holds the collar 249 in position. Valve union 251, which is internally threaded to connect to the valve stem (not shown) is held in position by the collar 249. Ring 253 is pressed between the union tip 255 of the valve union 251 and the lower end of the outside sleeve 247. The upper surface of the valve union 251 presses against washer 257.

The inside of the body 245 has threads 259 for threadably connecting with the plunger 261. A shaft 263 extends upward from the plunger 261 to connect with screw 265 and handle 267. The entire screw 265, handle 267, shaft 263 and plunger 261 are held in position by nut 269 being threadably received inside of body 245. O-ring seal 271 prevents leakage around screw 265. Seal washer 272 is pressed between nut 269 and a shoulder inside of body 245.

In operation, the outside sleeve 247 is turned while the threads inside of valve union 251 are pressed against the top of the valve stem. This will cause the valve union 251 to thread onto the valve stem until the valve stem presses against washer 257. Thereafter, the handle 267 is turned driving the lower end 273 of the plunger 261 against the valve to allow fluid communication with passage 275 of the fitting 243 via cross bore 277 of plunger 261. By first connecting the valve 251 with the outside sleeve 247 and subsequently driving down the lower end 273 of plunger 261 by turning handle 267, fluid communication is now established between the valve stem and passage 275. By connecting in this manner, there will be no loss of pressure during connection of the no-loss chuck valve 19. By reversing the process, there will be no loss of pressure in disconnecting the no-loss chuck valve 19.

Various types of tire pressure monitoring systems can be used in combination with the no-loss chuck valves 19. The entire pressure monitoring system can have an electronic signal that is transmitted to the meter 17 to communicate pressure inside the tire. While the sensors can be inside the tire, they can also be outside the tire and even form a part of the no-loss chuck valve 19. Various tire pressure monitoring systems are commercially available.

Figure 3:
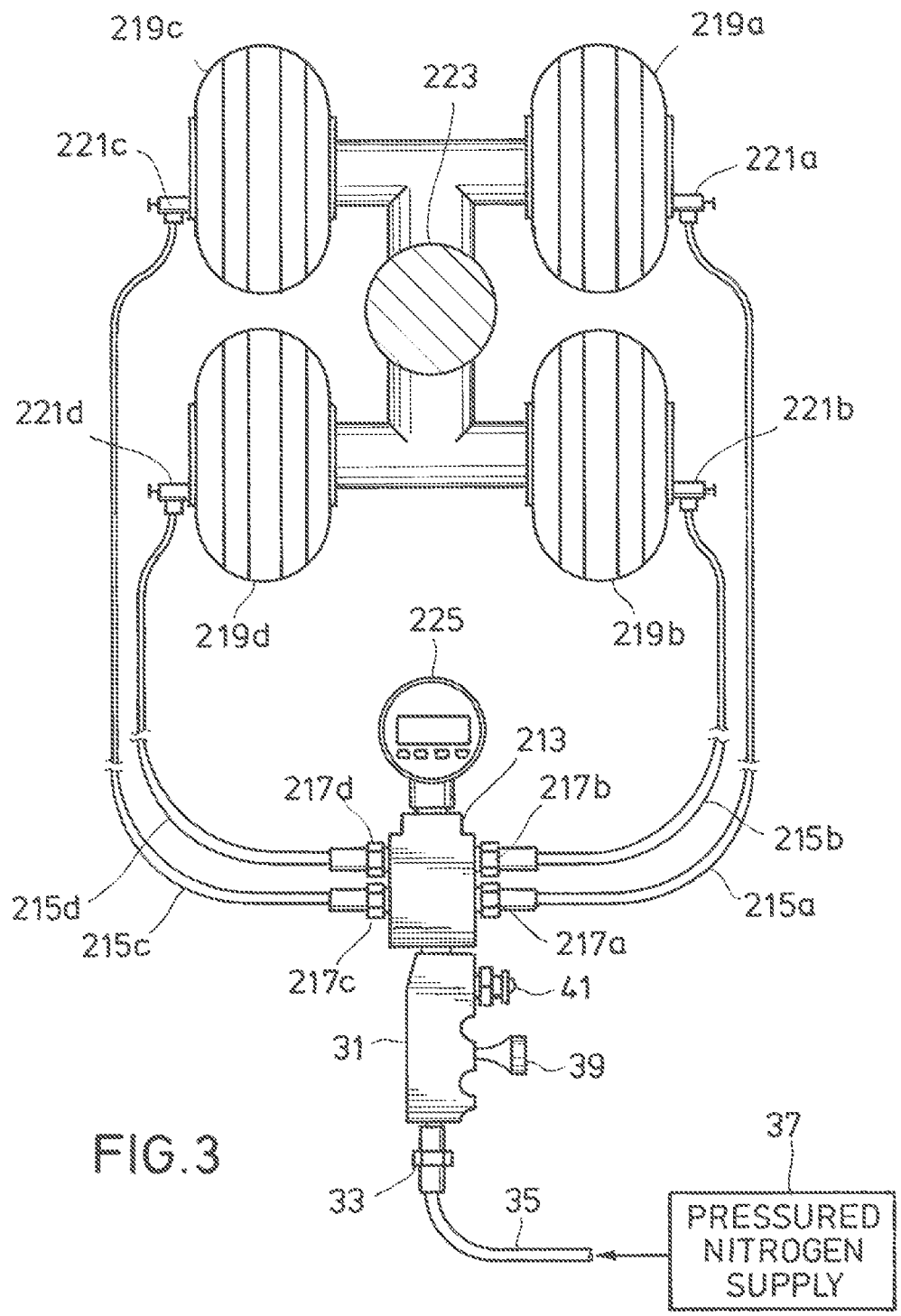
FIG. 3 is a pictorial illustration of the mechanical portion of the tire pressure equalizer and/or inflator being used on four tires suspended from a single strut of an aircraft.

Whether the aircraft has two, four, six, eight or ten tires suspended from a single strut, the tire pressure needs to be equalized. In FIG. 3, the pressurized nitrogen supply 37 is connected through nitrogen supply line 35 and nitrogen supply fitting 33 to nitrogen control block 31. Nitrogen control block 31 has the spring-loaded control valve 39 and the spring-loaded bleed valve 41, all of which is identical to the prior description of FIG. 1. However, the nitrogen distribution block 213 is different. The nitrogen distribution block 213 has four high-pressure nitrogen lines 215a, 215b, 215c and 215d connecting through high pressure fittings 217a, 217b, 217c and 217d, respectively, to tires 219a, 219b, 219c and 219d through chucks 121a 121b, 121c and 121d, respectively. All of the tires 219a, 219b, 219c and 219d are suspended from the strut 223. In equalizing the nitrogen pressure in the four-tire environment as shown in FIG. 3, the meter 225 is similar to the meter 17 used in FIG. 1, hut only has the steps necessary for equalizing the pressure in a four-tire strut versus a six-tire strut. The only changes in the program described in conjunction with FIGS. 8 and 9a thru 9e is the steps eliminated due to the lower number of tires.

Turning to FIG. 4, a two-tire landing gear is shown on which the pressure again needs to be equalized. Like numbers for like items as appear in FIGS. 1 and 3 are used in FIG. 4. The nitrogen distribution block 227 as shown in FIG. 4 only is used to equalize the pressure in tires 229a and 22b, which are connected via chuck valves 231a and 231b to high pressure nitrogen lines 233a and 233b and high pressure fittings 235a and 235b, respectively, to nitrogen distribution block 227. A meter 237 is connected to the high pressure distribution block 227.

The meter 237 is similar to the meter 17 used in FIG. 1, except steps have been eliminated because they are unnecessary due to tire pressure being equalized for a smaller number of tires in FIG. 4 than in FIG. 1. The tires in FIG. 4 are suspended from strut 239.

Referring now to FIG. 7, a cross-sectional view of the nitrogen distribution monitoring block 25 is shown. The nitrogen distribution block 25 is connected to the nitrogen control block 31 which has spring-loaded bleed valve 41. The top of the nitrogen distribution block 25 connects to the meter 17. The nitrogen from the pressurized nitrogen supply 37 flows through central bore 241 toward the meter 17. The nitrogen in central bore 241 flows through the fittings 23a thru 23f for distribution to the wheels 11a thru 11f, respectively. By having the central bore 241 extending straight through the central bore 241 of the nitrogen distribution block 25, the nitrogen will equalize faster in the wheels 11a thru 11f. The pressurized nitrogen within central bore 241 will provide an equalized pressure faster inside wheels 11a through 11f. This is because of the extended central bore 241 opposite the meter 17. This allows for a quicker equalization of pressure in wheels 11a through 11f.

What we claim is:

1. A method of inflating and equalizing pressure on multiple tires suspended from a single strut of an aircraft using a inflation/equalization device, said inflation and equalization occurring from a source of pressurized gas, said method comprising the following steps:

starting said inflation/equalization device by applying power and setting pressure, said starting including determining if said inflation/equalization device (1) has a current certification, (2) user is registered for the device and (3) has correct Zulu date and time;

testing said inflation/equalization device by (1) checking battery level, (2) checking display and (3) checking sensors;

calculating said inflation/equalization device including verifying (1) said pressurized gas is unlocked, (2) chucks are unlocked and (3) pressure is released;

setting up said inflation/equalization device by (1) connecting said chucks to valve stems of said multiple tires, (2) opening said chucks and (3) connecting said pressurized gas to a pressure control block;

finalizing said inflating and equalizing by adjusting pressure and allowing said pressure to equalize in said multiple tires;

recording each preceding step;

and terminating said inflating and equalizing if any preceding step fails.

2. The method of inflating and equalizing pressure in multiple tires suspended from a single strut of an aircraft as given in claim 1 wherein said pressurized gas is nitrogen.

3. The method of inflating and equalizing pressure in multiple tires suspended from a single strut of an aircraft as given in claim 2 wherein in said finalizing step true PSI is recorded.

4. The method of inflating and equalizing pressure in multiple tires suspended from a single strut of an aircraft as given in claim 3 wherein after said finalizing step disconnecting said chucks, moving to second multiple tires of a second strut and repeating said setting up step and said finalizing step.

5. The method of inflating and equalizing pressure in multiple tires suspended from a single strut of an aircraft as given in claim 1 wherein said finalizing step incudes disconnecting said chucks and monitoring for pressure change and if pressure change is greater than ±0.025%, repeat said finalizing step at least once.

6. The method of inflating and equalizing pressure in multiple tires suspended from a single strut of an aircraft as given in claim 5 wherein said setting up step includes an initial sub-step of confirming zero pressure and releasing any internal pressure.

7. The method of inflating and equalizing pressure in multiple tires suspended from a single strut of an aircraft as given in claim 6 wherein said setting up step includes recording which of said multiple tires of said struts is being pressurized and/or equalized.

\* \* \* \* \*